US008620326B2

(12) United States Patent
Zhang et al.

(10) Patent No.: US 8,620,326 B2
(45) Date of Patent: *Dec. 31, 2013

(54) HANDOVER PROCESSING METHOD AND DEVICE

(71) Applicant: Huawei Technologies Co., Ltd., Shenzhen (CN)

(72) Inventors: Liangliang Zhang, Beijing (CN); Jing Liu, Shanghai (CN); Yan Peng, Shanghai (CN); Bo Lin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/763,227

(22) Filed: Feb. 8, 2013

(65) Prior Publication Data

US 2013/0150047 A1 Jun. 13, 2013

Related U.S. Application Data

(63) Continuation of application No. 13/590,907, filed on Aug. 21, 2012, now Pat. No. 8,396,479, which is a continuation of application No. PCT/CN2011/072696, filed on Apr. 13, 2011.

(30) Foreign Application Priority Data

Jun. 21, 2010 (CN) .......................... 2010 1 0206990

(51) Int. Cl.
*H04W 36/00* (2009.01)

(52) U.S. Cl.
USPC ......................................... 455/439; 455/436

(58) Field of Classification Search
USPC ........................... 455/436–444; 370/331–334
See application file for complete search history.

(56) References Cited

U.S. PATENT DOCUMENTS

| 8,249,020 B2 * | 8/2012 | Qiu ................................ 370/331 |
| 8,260,206 B2 * | 9/2012 | Damnjanovic ............... 455/63.1 |
| 2009/0111503 A1 | 4/2009 | Pedersen et al. |

(Continued)

FOREIGN PATENT DOCUMENTS

| CN | 101299876 A | 11/2008 |
| CN | 101466170 A | 6/2009 |

(Continued)

OTHER PUBLICATIONS

International Search Report and Written Opinion of the International Searching Authority issued in corresponding PCT Patent Application No. PCT/CN2011/072696, mailed Jul. 21, 2011.

(Continued)

*Primary Examiner* — Ajit Patel
(74) *Attorney, Agent, or Firm* — Brinks Gilson & Lione (57) ABSTRACT

A handover processing method includes obtaining, by a relay station, information, where the information is used for determining whether a mobility management entity (MME) of a user equipment is in a mobility management entity pool (MME pool) to which a neighboring eNB belongs; and determining, by the relay station, that an X2 interface between a serving eNB of the relay station and the neighboring eNB cannot be used for handover if the MME of the user equipment is not in the MME pool to which the neighboring eNB belongs. The foregoing solutions enable the relay station to initiate a correct handover procedure.

13 Claims, 6 Drawing Sheets

(56) References Cited

U.S. PATENT DOCUMENTS

| | | | |
|---|---|---|---|
| 2010/0195525 A1 | 8/2010 | Eerolainien | |
| 2010/0311419 A1* | 12/2010 | Bi | 455/435.1 |
| 2011/0002304 A1 | 1/2011 | Lee et al. | |
| 2011/0116473 A1 | 5/2011 | Shaheen et al. | |
| 2011/0218003 A1 | 9/2011 | Qiu | |
| 2011/0250892 A1 | 10/2011 | Gupta et al. | |
| 2012/0039303 A1* | 2/2012 | Stenfelt et al. | 370/331 |
| 2012/0163336 A1 | 6/2012 | Adjakple et al. | |
| 2013/0029666 A1* | 1/2013 | Jung et al. | 455/436 |

FOREIGN PATENT DOCUMENTS

| | | |
|---|---|---|
| CN | 101494885 A | 7/2009 |
| CN | 101657028 A | 2/2010 |
| CN | 101754308 A | 6/2010 |
| CN | 102026313 B | 3/2012 |
| WO | WO 2008134962 A1 | 11/2008 |
| WO | WO 2009024908 A2 | 2/2009 |

OTHER PUBLICATIONS

LTE, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2" (Release 9) 3GPP TS 36.300. V9.4.0, Jun. 2010.

CATT, "Signaling for the Attribute of the NRT of RN" Agenda Item 14.1, 3GPP TSG RAN WG3 #68. Montreal, Canada, May 10-14, 2010. R3-101457.

Nokia Siemens Networks, "Handover Type Determination for Relay" Agenda Item 14.5, 3GPP TSG-RAN WG3 Meeting RAN3#69bis. Jacksonville, USA, Oct. 15-19, 2010. R3-103544.

Extended European Search Report issued in corresponding European Patent Application No. 11797516.9, mailed Jan. 7, 2013.

Ericsson, "Stage-2 Description of Relaying in 36.300" Change Request 36.300 cr 0232, Current Version 9.3.0, 3GPP TSG-RAN WG2 Meeting #70. Montreal, Canada, May 10-14, 2010. R2-102718.

Potevio, "How RNs Get Proper Information for HO Type Determination" Agenda Item 14.4, 3GPP TSG-RAN WG3 #69. Madrid, Spain, Aug. 23-27, 2010. R3-102136.

Huawei, "Consideration on HO Type Choosing Issue" Agenda Item 7.3, 3GPP TSG-RAN WG3 AH. Beijing, China, Jun. 29-Jul. 1, 2010. R3-101867.

* cited by examiner

| Serving cell A | Serving cell B | Serving cell C |
|---|---|---|
| Neighboring cells 1, 2, and 3 | Neighboring cells 3, 4, and 5 | Neighboring cells 6 and 7 |

FIG. 4a

| Identifiers of neighboring eNBs | Information of mobility management entity pools to which neighboring eNBs belong |
|---|---|
| Identifier of a neighboring eNB 1 (eNB1 ID) | Mobility management entity pool to which the neighboring eNB 1 belongs |
| Identifier of a neighboring eNB 2 (eNB2 ID) | Mobility management entity pool to which the neighboring eNB 2 belongs |
| ...... | ...... |
| Identifier of a neighboring eNB n (eNBn ID) | Mobility management entity pool to which the neighboring eNB n belongs |

HANDOVER PROCESSING METHOD AND DEVICE

CROSS-REFERENCE TO RELATED APPLICATIONS

This application is a continuation of U.S. application Ser. No. 13/590,907, filed on Aug. 21, 2012, which is a continuation of International Application No. PCT/CN2011/072696, filed on Apr. 13, 2011, which claims priority to Chinese Patent Application No. 201010206990.6, filed on Jun. 21, 2010, both of which are hereby incorporated by reference in their entireties.

FIELD OF THE APPLICATION

The present application relates to the field of communications technologies, and in particular, to a handover processing method and device.

BACKGROUND OF THE APPLICATION

Figure 1:
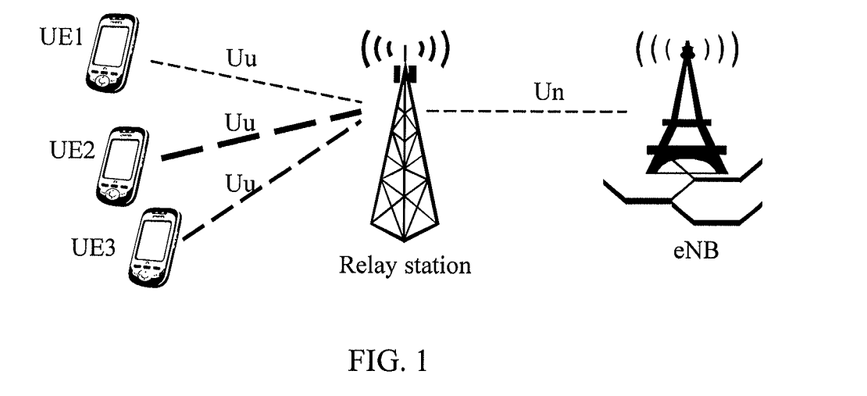
FIG. 1 is a schematic diagram of an LTE-A radio access network in the prior art.

In a modern communication system, a relay technology is applied more and more widely. An LTE-A (LTE-Advance, LTE-Advanced) technology is taken as an example. The LTE-A technology is an evolved version of an LTE (Long Term Evolution, long term evolution) technology, and in the LTE-A technology, a radio link between an eNB and a terminal is split into a link between the eNB and a relay node and a link between the relay node and the terminal by adopting a relay technology, so as to implement better capacity and coverage. FIG. 1 is a schematic diagram of an LTE-A radio access network in the prior art. The network includes a donor eNodeB (DeNB, Donor eNodeB), a relay node (RN, Relay Node), and three user equipments (UE, User Equipment) that are subordinate to the relay node. A user equipment is also a terminal. Three terminals are marked as a UE1, a UE2, and a UE3. Interfaces between the three terminals and the RN are Uu interfaces; an interface between the RN and the DeNB is a Un interface; an interface between eNBs is called an X2 interface, and an interface between the eNB and a mobility management entity (MME, Mobility Management Entity) or a gateway (GW, Gateway) is an S1 interface. A message transmitted through an X2 interface is called an X2 message, and a message transmitted through an S1 interface is called an S1 message.

In a relay architecture provided in the prior art, if an S1 message is used at a Un interface, the eNB uses the S1 message on an EPC (Evolved packet core network, evolved packet core network) side; and if an X2 message is used at the Un interface, the eNB uses the X2 message on the EPC side. The foregoing process is described in the following by taking that a relay station initiates a handover request message to an eNB by using an S1 message in a handover process of a user equipment as an example.

After receiving a handover request message (S1-AP: HO required message), the eNB may modify only an S1AP UE ID (an S1 application protocol identifier of a user equipment) of the S1 message, and keeps the remaining part unchanged, and then forwards the S1 handover request message (S1AP: HO required message) to the MME to perform a corresponding S1 handover procedure. The S1-AP or S1AP here represents an S1 Application Protocol (S1 application protocol). The prior art has at least the following problem: It is unable to properly determine whether an X2 interface or an S1 interface is used for handover, which may cause a handover failure.

SUMMARY OF THE APPLICATION

The embodiments described below aim to provide a handover processing method and device, so as to ensure that a proper handover procedure is initiated.

According to an embodiment, a handover processing method is provided. In the method: a relay station obtains information, where the information is used for determining whether a mobility management entity (MME) of a user equipment is in a mobility management entity pool (MME pool) to which a neighboring eNB belongs. The relay station determines that an X2 interface between a serving eNB of the relay station and the neighboring eNB cannot be used for handover if the MME of the user equipment is not in the MME pool to which the neighboring eNB belongs.

According to another embodiment, a relay station is provided. The relay station includes an information obtaining unit and a handover determining unit. The information obtaining unit is configured to obtain information, where the information is used for determining whether a mobility management entity (MME) of a user equipment is in a mobility management entity pool (MME pool) to which a neighboring eNB belongs. The handover determining unit is coupled to the information obtaining unit and configured to determine that an X2 interface between a serving eNB of the relay station and the neighboring eNB cannot be used for handover when the MME of the user equipment is not in the MME pool to which the neighboring eNB belongs.

In the embodiments, the relay station may obtain the related information that is used for determining whether the MME pool to which the neighboring eNB belongs is the same as the MME pool including the MME of the user equipment; and when the MME pool to which the neighboring eNB belongs is different from the MME pool including the MME of the user equipment, the RN may determine that the X2 interface between the serving eNB of the RN and the neighboring eNB cannot be used for the handover, and therefore, a correct handover procedure may be initiated, to reduce probability of a handover failure.

BRIEF DESCRIPTION OF THE DRAWINGS

To describe the solutions in the embodiments or in the prior art more clearly, the accompanying drawings required for describing the embodiments or the prior art are briefly introduced in the following. Apparently, the accompanying drawings in the following description are only about some embodiments, and persons of ordinary skill in the art may still derive other drawings from these accompanying drawings without making creative efforts.

DETAILED DESCRIPTION OF THE EMBODIMENTS

The solutions in the embodiments are clearly and completely described with reference to the accompanying drawings. The embodiments are merely exemplary and other embodiments may be derived from these embodiments by those of ordinary skill. Such other embodiments are understood to fall within the protection and scope of the claims.

Figure 2:
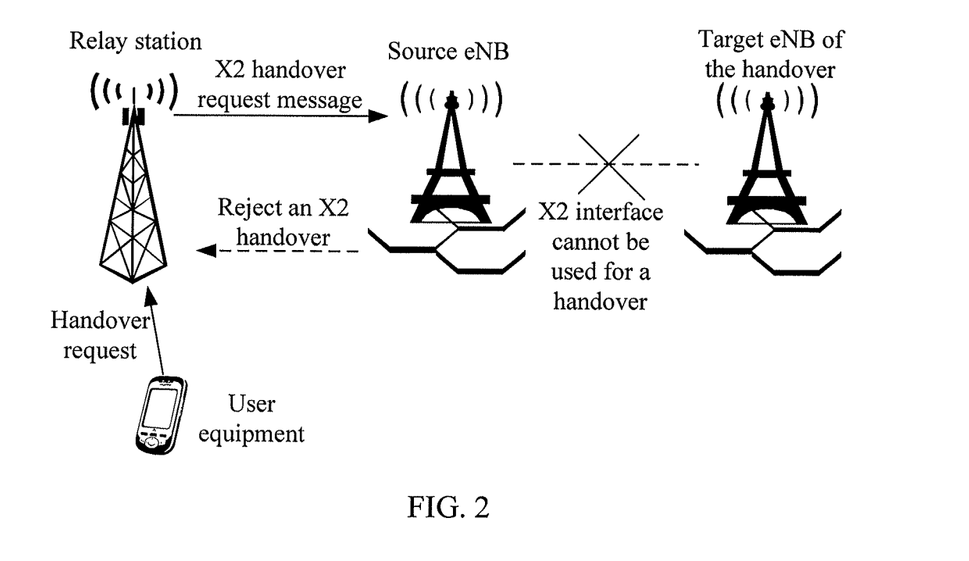
FIG. 2 is a schematic diagram of a handover processing process according to an embodiment.

To facilitate description, taking FIG. 2 as an example, a handover processing process is briefly introduced, to analyze a possible reason for a handover failure in this process. When a UE needs to be handed over from a relay station under a DeNB to a target neighboring eNB, the relay station sends a handover request to the DeNB of the relay station. However, the RN does not learn whether X2 handover can be preformed between the DeNB and the target eNB, and therefore, does not learn which type of handover (S1/X2 handover) needs to be initiated. If X2 handover cannot be performed between the DeNB and the target eNB, once the RN initiates X2 handover, the DeNB cannot use an X2 message to send handover request signaling to the target eNB. In this case, the DeNB has to reject the handover request of the relay station through a corresponding X2 message, which delays a handover procedure.

In the prior art, if an X2 interface between two eNBs cannot be used for handover, one of possible reasons is that the two eNBs do not belong to the same MME pool (mobility management entity pool). An MME of a terminal is in an MME pool to which a serving eNB (source eNB) of the terminal belongs. If the two eNBs do not belong to the same MME pool (mobility management entity pool), it means that the MME of the terminal is not in any MME pool to which a target eNB belongs. When the terminal is handed over from the source eNB to the target eNB, the MME is changed, and X2 handover cannot be performed between the two eNBs. In an LTE system where a relay station is introduced, the RN does not learn information of the MME pool to which a target eNB belongs, and therefore, it is unable to determine whether X2 handover can be initiated.

A method for processing a handover failure is further provided in the present invention, to reduce occurrence of handover failure caused by the condition that the target eNB and the source eNB or the relay station of the source eNB belong to different MME pools. The conventional concept of the MME pool in the prior art is briefly introduced in the following. An MME pool refers to a logical area that is formed by multiple MMEs. These MMEs that form the same MME pool have equivalent functions. In one MME pool, a UE may obtain a NAS (Non-Access-Stratum, non-access-stratum) service without changing an MME to which the UE is attached, and different MME pools may overlap with each other.

Figure 3A:
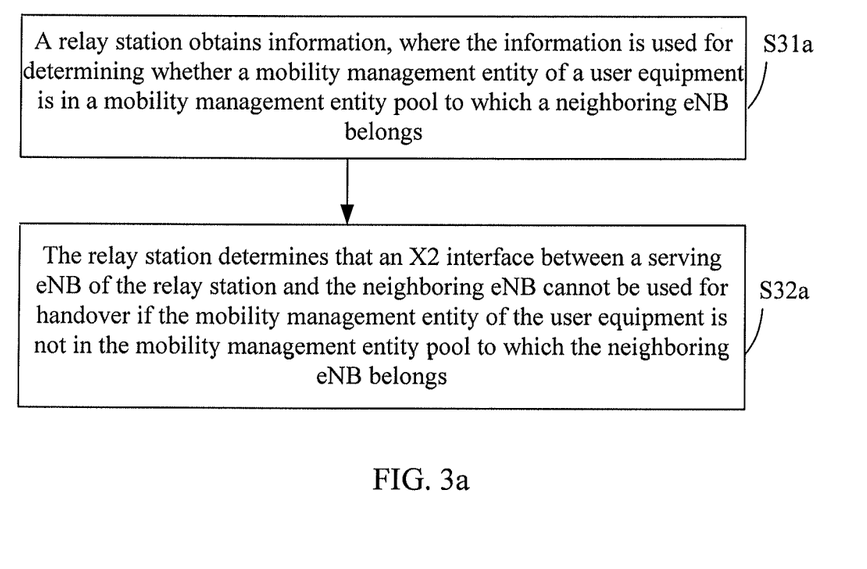
FIG. 3a is a schematic diagram of a handover processing method according to an embodiment.

FIG. 3a is a schematic diagram of a handover processing method according to an embodiment. The method includes:

S31a: A relay station obtains information, where the information is used for determining whether a mobility management entity (MME) of a user equipment is in a mobility management entity pool (MME pool) to which a neighboring eNB belongs.

The information obtained by the relay station is used for determining whether a mobility management entity (MME) of a user equipment subordinate to the relay station is in the mobility management entity pool (MME pool) to which the neighboring eNB belongs, that is, is used for determining whether the mobility management entity pool (MME pool) to which the neighboring eNB belongs is the same as an MME pool including the MME of the user equipment. The foregoing two statements are only different in expression forms, and represent the same essence of the solution.

The neighboring eNB is a neighboring eNB of the relay station (that is, a neighboring eNB of a serving eNB of the relay station), may be a neighboring eNB corresponding to a neighboring cell of the relay station RN, or may be a neighboring eNB of a donor eNB (DeNB) of the RN, or the like.

The information may be information of an MME pool(s) of a neighboring eNB. The information of the MME pool(s) of the neighboring eNB may be expressed by a GU Group Id list, to indicate an MME pool(s) to which the neighboring eNB belongs. According to this, the relay station determines whether the MME pool to which the neighboring eNB belongs is the same as a pool including an MME that serves a user equipment subordinate to the relay station. That is, the relay station determines whether the neighboring eNB and the UE use the same MME pool. To enable the RN to identify the correspondence between Group Id lists and a neighboring eNB, the information may further carry a corresponding neighboring eNB identifier.

Alternatively, the information of the MME pool of the neighboring eNB may be 1 bit (bit), and is only used to indicate whether the MME pool to which the neighboring eNB belongs is the same as the MME pool including the MME of the UE. Specially, an identifier of the terminal may further be carried at the same time, such as a CRNTI (Cell Radio Network Temporary Identify, cell radio network temporary identifier), which is not limited in this embodiment.

For example, the relay station may obtain the information from an OAM (Operation Administration and Maintenance, operation administration and maintenance) device, and may also obtain the information from a DeNB of the relay station. If the RN obtains the information from the DeNB of the RN, the DeNB may notify the RN of the information through a new message; and the DeNB may also carry the information in a conventional message to notify the RN. The conventional message may be an X2 setup Request/response (X2 setup request/response) message, or an eNB configuration update (eNB configuration update) message, which is not limited in this embodiment. In this way, in an X2 setup procedure or an eNB configuration update procedure, the serving eNB may notify the RN of the information of the MME pool to which the neighboring eNB belongs.

For each neighboring cell, the eNB may notify the RN of MME pool information of a neighboring eNB corresponding to each neighboring cell. For example, in an eNB configuration update message or an X2 setup request message or an X2 setup response message, the eNB may add a "GU Group Id List" into neighbor information (Neighbor Information) corresponding to each serving cell. The "GU Group Id List" includes information of multiple pools, and may include information of all pools to which a neighboring eNB corresponding to a neighboring cell belongs. For example, if the number of all pools to which the neighboring eNB corresponding to the neighboring cell (which may be represented by a cell identifier ECGI) belongs is 10, the "GU Group Id List" includes information of 10 pools, that is, 10 GU Group IDs of corresponding pools. For example, the GU Group Id (globally unique group Id, Globally Unique Group Id) is an information element (IE, information element), and corresponds to a pool area (pool area). A GU Group Id may include a PLMN (public land mobile network, Public Land Mobile Network) Id and an MME Group Id. Alternatively, 1 bit may be added into the neighbor information corresponding to each serving cell, and is used to indicate whether the MME pool to which the neighboring eNB belongs is the same as the MME pool including the MME of the UE. Furthermore, the message may further carry a UE identifier, such as a CRNTI (Cell Radio Network Temporary Identify, cell radio network temporary identifier), which is not limited in this embodiment.

For example, for each neighboring eNB, the eNB may notify the RN of MME pool information of the neighboring eNB. The foregoing message may further carry an identifier of a corresponding neighboring eNB. A specific notification method is not limited in this embodiment.

For example, when information of an MME pool of the neighboring eNB changes, the RN may obtain update information of the MME pool of the foregoing neighboring eNB. For example, the DeNB notifies, through an eNB configuration update message, the RN that the information of the MME pool changes. The eNB configuration update message may include information of an MME pool(s) that needs to be added to the neighboring eNB(s), and may also include MME pool(s) information that needs to be deleted from the neighboring eNB(s), which is not detailed here again. For example, the MME pool information of the neighboring eNB may be identified by a GU Group Id list. To enable the RN to identify the correspondence between Group Id lists and a neighboring eNB, the message may further carry a corresponding neighboring eNB identifier; or 1-bit information is carried in a defined message to indicate whether the MME pool to which the neighboring eNB belongs is the same as the MME pool including the MME of the UE.

How the RN obtains neighboring cell information provided by the DeNB, or how the DeNB obtains neighboring eNB identifier information according to the neighboring cell information provided by the RN may be implemented through the following manner: The neighboring cell information may be an ECGI of the neighboring cell. The ECGI (E-UTRAN Cell Global Identifier, E-UTRAN cell global identifier) is a type of Cell ID (cell identifier). The ECGI is formed by a PLMN Identity (public land mobile network identity) and an E-UTRAN Cell Identifier (evolved universal terrestrial radio access network cell identifier). In this way, the relay station may obtain a corresponding neighboring eNB identifier through the ECGI of the neighboring cell. Definitely, a neighboring cell identifier or an eNB identifier may be represented in another way, and the foregoing is only an example and is not limited.

Figure 4A:
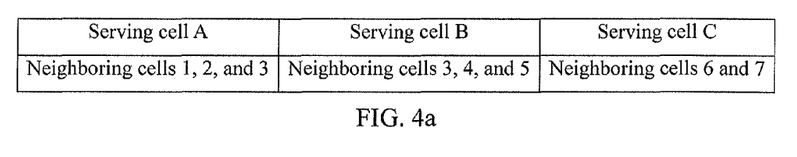
FIG. 4a is a schematic diagram of a neighboring cell list provided by a relay station for a serving eNB according to an embodiment.
Figure 4B:
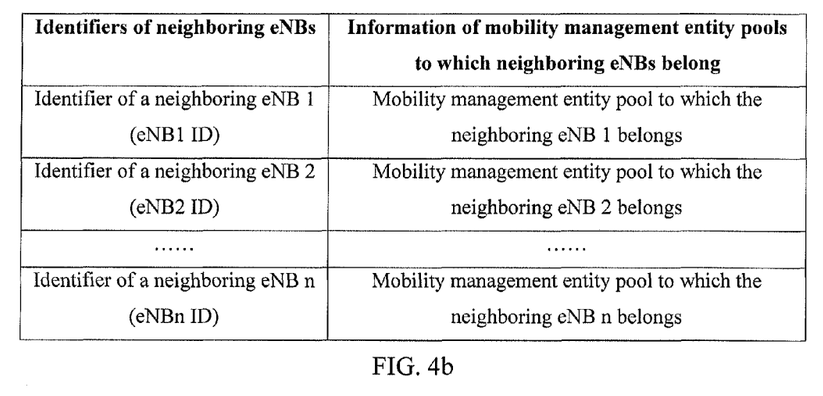
FIG. 4b is a schematic diagram of information that is about mobility management entity pools to which neighboring eNBs belong and is provided by a serving eNB for a relay station according to an embodiment.

Taking FIG. 4a as an example for the following description, an RN has three serving cells, which are cells A, B, and C. Neighboring cells of cell A are cells 1, 2, and 3; neighboring cells of cell B are cells 3, 4, and 5; and neighboring cells of cell C are cells 6 and 7. Cells 1, 2, 3, and 4 are serving cells of a neighboring eNB2; cells 5 and 6 are serving cells of a neighboring eNB3; and a cell 7 is a serving cell of a neighboring eNB4, so the neighboring eNB2, eNB3, and eNB4 are all neighboring eNBs of the RN. After learning these neighboring cells, an eNB may notify the relay station of MME pool information of neighboring eNBs corresponding to these neighboring cells. FIG. 4b is a schematic diagram of information that is about mobility management entity pools to which neighboring eNBs belong and is provided by a serving eNB for a relay station according to an embodiment. To facilitate description, FIG. 4b appears in the form of a list. If a serving eNB of a relay station has n (n is a positive integer) neighboring eNBs, as shown in FIG. 4b, the serving eNB may notify the relay station of eNB IDs (eNB ID) of the n neighboring eNBs and an MME pool that is corresponding to each neighboring eNB. As described in the foregoing embodiment, these pieces of information may be carried in an eNB configuration update message or an X2 setup request message or an X2 setup response message, which is not detailed again in this embodiment.

S32a: The relay station determines that an X2 interface between a serving eNB of the relay station and the neighboring eNB cannot be used for handover if the MME of the user equipment is not in the MME pool to which the neighboring eNB belongs.

The RN obtains information of an MME pool to which the neighboring eNB belongs, and when the RN needs to hand over a certain UE (such as a UE1) of the RN to a neighboring eNB such as an eNB2, the RN may compare the obtained information of the MME pool to which the neighboring eNB belongs with information of an MME corresponding to the terminal, and determine whether an MME pool including the MME of the UE is the same as the MME pool(s) to which the neighboring eNB belongs. If a pool of the MME pool(s) to which the neighboring eNB belongs is the same as the MME pool including the MME of the UE, an X2 interface between the serving eNB of the RN and the neighboring eNB can be used for handover; otherwise, the X2 interface cannot be used for the handover. The determining whether the MME pool including the MME of the UE is the same as the MME pool(s) to which the neighboring eNB belongs may also be expressed as: determining whether the MME of the UE is in the MME pool(s) to which the neighboring eNB belongs. The two expressions represent the same solution, and are only different in the form of representation. When the MME of the user equipment is not in any MME pool to which the neighboring eNB belongs, an interface between the neighboring eNB and the serving eNB cannot be used for handover, that is, an X2 handover procedure cannot be initiated between the two eNBs.

Figure 4C:
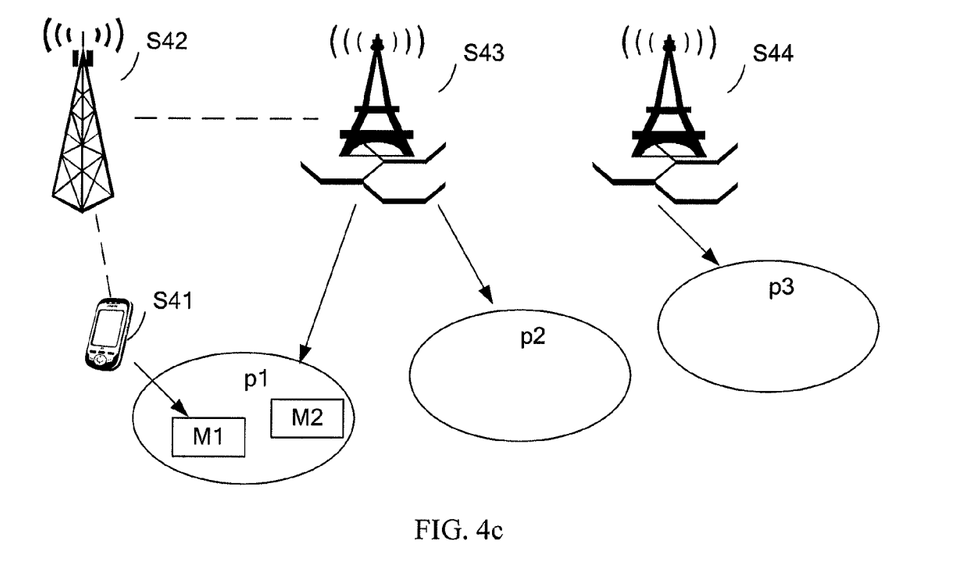
FIG. 4c is a schematic diagram of MME pool relationships among a user equipment, a relay station, a serving eNB and a neighboring eNB according to an embodiment.

To facilitate the description of MME pool relationships between the user equipment, the relay station, the serving eNB, and the neighboring eNB, the following is briefly described by taking FIG. 4c as an example. It should be noted that, FIG. 4c is only an instance scenario, and many different scenarios may further exist during specific implementation. A user equipment 41 belongs to a relay station 42, the relay station 42 belongs to a serving eNB 43, and another eNB 44 is a neighboring eNB of the serving eNB 43, and is also a neighboring eNB of the user equipment 41 and the relay station 42. As shown in FIG. 4c, three MME pools are shown, which are p1, p2, and p3, where p1 and p2 are MME pools to which the serving eNB 43 belongs, and p3 is an MME pool to which the neighboring eNB 44 belongs. A mobility management entity of the user equipment 41 is M1 in the pool p1, and the mobility management entity M1 is not in the pool p3 to which the neighboring eNB 44 belongs. That is, the pool p1 to which M1 belongs is not the same as the pool p3 to which the neighboring eNB 44 belongs. In this way, it may be determined that an X2 interface between the serving eNB 43 and the neighboring eNB 44 cannot be used for handover. Definitely, another terminal may work under the relay station 42, so another MME may be in the pool p1, such as a pool M2, which is not limited in this embodiment.

In a conventional LTE/SAE, a GUMMEI may be used for uniquely identifying one MME. The GUMMEI may be formed by a PLMN ID, a GU Group ID, and an MMEC. The PLMN is a network identifier; the GU Group ID, that is, an MME pool identifier, is used for uniquely identifying an MME pool in a PLMN; and the MMEC is an MME identifier and used for uniquely identifying an MME in an MME pool. MME information corresponding to the terminal may be an MME identifier (such as GUMMEI) of the terminal, and may also be an identifier (such as GU Group ID) of an MME pool including an MME of the terminal.

By adopting the solutions in the foregoing embodiment, the RN may determine whether the X2 interface between the serving eNB of the RN and the neighboring eNB can be used for the handover, so that a correct handover procedure may be initiated, which reduces the probability of a handover failure and helps improve a handover success possibility.

Figure 3B:
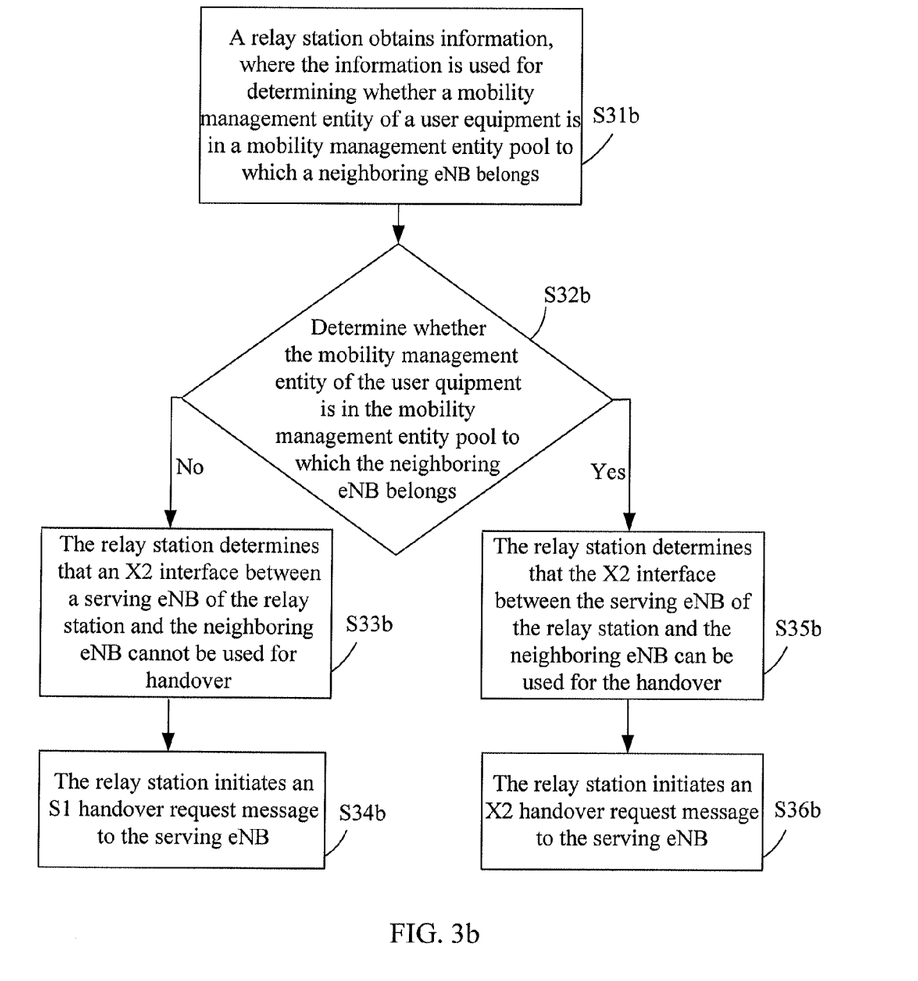
FIG. 3b is a schematic diagram of another handover processing method according to an embodiment.

FIG. 3b is a schematic diagram of another handover processing method according to an embodiment. The method includes:

S31b: This process is the same as the process 31a in FIG. 3a, and is not detailed here again.

S32b: Determine whether an MME of a user equipment is in an MME pool to which a neighboring eNB belongs; this process is that: determine whether the MME pool to which the neighboring eNB belongs is the same as the MME pool including the MME of the user equipment.

S33b: If no, a relay station determines that an X2 interface between a serving eNB of the relay station and the neighboring eNB cannot be used for handover. This process is the same as the process 32a in FIG. 3a, and is not detailed here again. The method further includes S34b: When the relay station determines that the X2 interface between the serving eNB and the neighboring eNB cannot be used for the handover, the relay station initiates an S1 handover request message to the serving eNB, to perform S1 handover. For example, by sending the S1 handover request message to the serving eNB, the relay station may request the serving eNB to initiate S1 handover to the neighboring eNB. Definitely, the relay station may perform this requesting through another manner, for example, may request the serving eNB of the relay station to initiate S1 handover to the neighboring eNB by sending a specially defined message, which is not limited in this embodiment.

Optionally, the foregoing embodiment may further include S35b: If the MME pool to which the neighboring eNB belongs is the same as the MME pool including the MME of the user equipment, that is, the MME of the user equipment is in the MME pool to which the neighboring eNB belongs, the relay station determines that the X2 interface between the serving eNB of the relay station and the neighboring eNB can be used for the handover. The embodiment may further include S36b: The relay station initiates an X2 handover request message to the serving eNB, to perform X2 handover. Definitely, the relay station may also initiate an S1 handover request message to the serving eNB at this time; however, in this way, the handover procedure is more complicated.

In this embodiment, by determining whether the MME pool to which the neighboring eNB belongs is the same as the MME pool including the MME of the user equipment, it is determined whether the X2 interface between the serving eNB of the relay station and the neighboring eNB can be used for the handover, so that a correct handover decision may be initiated. In this way, when the MME pool to which the neighboring eNB belongs is not the same as the MME pool including the MME of the user equipment, it may be determined that the X2 interface cannot be used for handover, that is, X2 handover cannot be performed between the serving eNB and the neighboring eNB. Once a UE subordinate to the relay station needs to be handed over to the neighboring eNB (that is, the neighboring eNB to which the X2 handover cannot be initiated becomes a target eNB of the handover), the relay station may decide to perform S1 handover, to reduce probability of a handover failure.

In an LTE-A technology, conventional handover manners may be categorized into two types, that is, X2 handover and S1 handover. To facilitate description, the two types of handover are briefly described. The X2 handover means that a handover-related procedure is performed between eNBs through an X2 interface. The S1 handover is different, and if a handover-related procedure needs to be performed between a source eNB and a target eNB of handover, an S1 interface between the source eNB and a core network device (such as an MME) needs to be used, and therefore, interaction between the source eNB and a core network needs to be involved, thereby increasing handover complexity to some extent.

The X2 handover does not involve many core network operations and is relatively simple, so generally, the relay station may selectively and preferably initiates X2 handover. If the MME pool to which the neighboring eNB belongs is not the same as the MME pool including the MME of the user equipment, S1 handover needs to be initiated, so that the UE subordinate to the relay station is handed over to the neighboring eNB (that is, a target eNB of handover) successfully, thereby improving a handover success rate.

It should be noted that, the foregoing embodiment of the handover processing method is applicable to the following scenarios, and for another possible application scenario, this embodiment is not limited thereto.

Scenario 1: Startup (startup) scenario:

Through an X2 interface setup procedure between the RN and a DeNB, the RN may notify information of a neighboring cell of the RN to the DeNB. In this way, according to information of one or more neighboring cells of the RN, the DeNB initiates a procedure of setting up an X2 interface between the DeNB and a corresponding neighboring eNB for the RN. If a corresponding X2 interface already exists between the DeNB and the corresponding neighboring eNB, repeated initiation is not required. After an X2 interface setup procedure is finished between the DeNB and the neighboring eNB, the DeNB notifies the RN of relative information of the X2 interface, such as NO X2 (whether an X2 interface exists or not), NO HO (whether handover can be performed or not), NO X2 HO (whether handover can be performed by using an X2 interface), or MME pools info (mobility management entity pool information), between the DeNB and the neighboring eNB. The eNB may feed back the information to the RN in an X2 setup (X2 interface setup) procedure or an eNB configuration (eNB configuration) procedure. Definitely, the information may also be fed back to the RN by using another procedure or a new message.

The eNB may obtain a neighboring eNB identifier through neighboring cell information of the RN, such as ECGI information, so the eNB may obtain, through an X2 setup procedure between the eNB and the neighboring eNB, information of the MME pool to which the neighboring eNB belongs, so that the eNB can determine whether the neighboring eNB and a subordinate terminal of the eNB (a terminal of the RN or a terminal of the eNB itself) are in the same MME pool, that is, determine whether the MME pool to which the neighboring eNB belongs is the same as the MME pool including the MME of the user equipment. The eNB may feed back information of the MME pool to which the neighboring eNB belongs to the RN; and may also make a determination directly and then notify the RN of a determining result. Notification information may be 1-bit indication information as described in the foregoing embodiment, which is not described here in further detail.

In a word, the eNB may notify the RN of relative information of an X2 interface between the neighboring eNB and the relay station or the eNB (DeNB), such as NO X2 (whether an X2 interface exists or not), NO HO (whether handover can be performed or not), NO X2 HO (whether handover can be performed by using an X2 interface), or MME pools info (mobility management entity pool information), actively or in the case that some trigger conditions are received.

The foregoing 1-bit information may also be expressed as NO X2 (whether an X2 interface exists or not), NO HO (whether handover can be performed or not), or NO X2 HO (whether handover can be performed by using an X2 interface) between each serving cell and a neighboring cell. Alternatively, two or three of the following information: NO X2 (whether an X2 interface exists or not), NO HO (whether handover can be performed or not), and NO X2 HO (whether handover can be performed by using an X2 interface) may be sent to the RN together.

Scenario 2: scenario in which the RN updates its own neighboring cell:

Through an eNB configuration update procedure, the RN sends neighboring cell information of the RN to the eNB. The eNB attempts to set up a corresponding X2 interface according to the neighboring cell information, and then feeds back interface-related information, such as NO X2, or NO HO, or NO X2 HO, or MME pools info, to the RN. The eNB may feed back the interface-related information to the RN in an eNB configuration update procedure, and definitely, may also feed back the information to the RN by using another procedure or a new message.

Scenario 3: scenario in which the DeNB updates its own neighboring cell:

The DeNB may set up an X2 interface with a eNB that is corresponding to a new neighboring cell, but the DeNB does not need to immediately notify the RN of updated interface-related information, such as NO X2, or NO HO, or NO X2 HO, or MME pools info. The eNB may send the interface-related information when the RN reports that the new neighboring cell is found, and definitely, may also feed back the information to the RN by using another procedure or a new message. Definitely, the DeNB may also actively notify the RN of the updated interface-related information, such as NO X2, or NO HO, or NO X2 HO, or MME pools info, immediately.

The MME pools info in this specification mainly refers to that the information may be information of an MME pool(s) of a neighboring eNB, or the MME pool information of the neighboring eNB may be 1 bit (bit), and is only used to indicate whether the MME pool to which the neighboring eNB belongs is the same as the MME pool including the MME of the UE, which is not limited in this embodiment. For more detailed description, reference is made to FIG. 3 and FIG. 4.

The RN obtains information that indicates whether handover can be performed between a serving eNB of the RN and a neighboring eNB that is corresponding to a neighboring cell of the RN and whether X2 handover can be performed between the serving eNB and the neighboring eNB, so that the RN can correctly select a handover type (for example, use S1 handover when the X2 handover cannot be used for handover), so as to efficiently initiate correct handover.

In the prior art, HeNB (Home eNB, home eNB) system handover includes handover between the eNB and the HeNB and handover between HeNBs, and may only support S1-based handover. For a case that an X2 interface is set up between HeNBs or between an HeNB and an HeNB GW, the handover based on an X2 interface is possible in an HeNB system. In this case, the HeNB may also need to determine whether to initiate X2 handover or initiate S1 handover. The solution described in this embodiment is also applicable to the HeNB system, and a content and a form of a message that are carried in this solution are consistent with those in the foregoing solution in the embodiment except that an application entity is a different one. For example, in the HeNB system, an application entity changes from an RN to an HeNB (such as an HeNB1), and an DeNB changes to an HeNB GW or an HeNB (such as an HeNB2).

Figure 5:
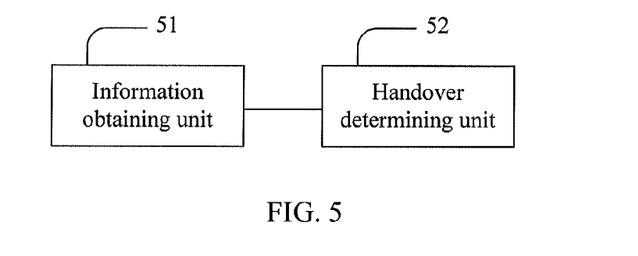
FIG. 5 is a schematic diagram of a relay station according to an embodiment.

Corresponding to the foregoing method embodiments, a relay station is provided in an embodiment. As shown in FIG. 5, the relay station may implement a function of forwarding relay information between an eNB and a terminal, and may include:

an information obtaining unit 51, configured to obtain information, where the information is used for determining whether a mobility management entity (MME) of a user equipment is in a mobility management entity pool (MME pool) to which a neighboring eNB belongs; and a handover determining unit 52, coupled to the information obtaining unit 51, and configured to determine that an X2 interface between a serving eNB of the relay station and the neighboring eNB cannot be used for handover when the MME of the user equipment is not in the MME pool to which the neighboring eNB belongs.

The relay station provided in this embodiment is capable of determining a proper handover type, to reduce probability of a handover failure.

Figure 6:
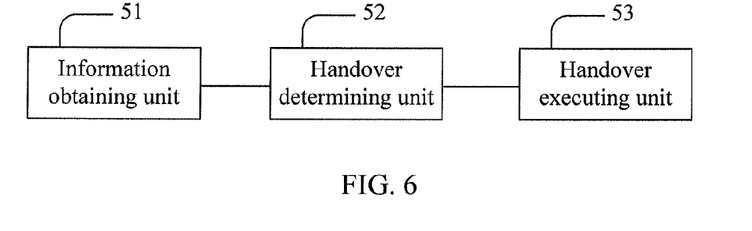
FIG. 6 is a schematic diagram of another relay station according to an embodiment.

The relay station may be further improved. As shown in FIG. 6, in addition to the information obtaining unit 51 and the handover determining unit 52, the relay station may further include: a handover executing unit 53, configured to initiate an S1 handover request message to the serving eNB when the handover determining unit 52 determines that the X2 interface between the serving eNB and the neighboring eNB cannot be used for the handover, so as to perform S1 handover.

In an implementation manner, the relay station shown in FIG. 6 may further be improved, and the information obtained by the information obtaining unit 51 is: information that indicates whether the MME of the user equipment is in the MME pool to which the neighboring eNB belongs. Accordingly, the information obtaining unit 51 is configured to provide the information for the handover determining unit 52.

Figure 7:
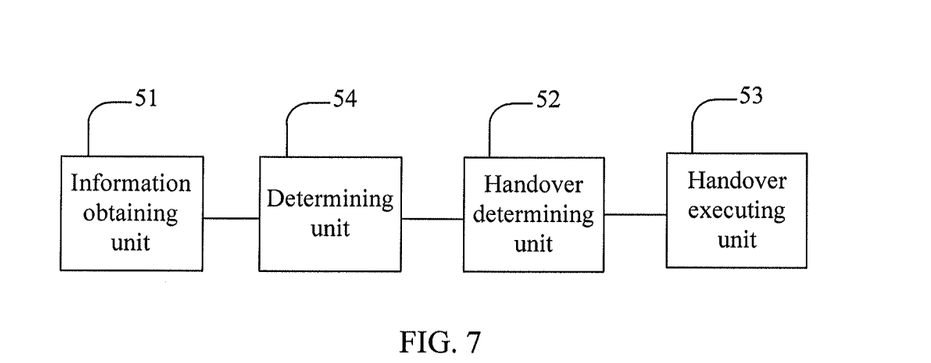
FIG. 7 is a schematic diagram of another relay station according to an embodiment.

In another implementation manner, the relay station shown in FIG. 6 may further be improved. As shown in FIG. 7, the relay station further includes a determining unit 54; and the information obtained by the information obtaining unit 51 is: information that indicates the MME pool(s) to which the neighboring eNB belongs; and the determining unit 54 is coupled to the information obtaining unit 51 and the handover determining unit 52, and is configured to: determine, based on the information that indicates the MME pool to which the neighboring eNB belongs, whether the MME of the user equipment is in the MME pool to which the neighboring eNB belongs, and notify the handover determining unit 52 of a determining result.

Further, the handover determining unit 52 is further configured to: determine that the X2 interface between the serving eNB of the relay station and the neighboring eNB can be used for handover when the MME of the user equipment is in the MME pool to which the neighboring eNB belongs. Further, the information obtaining unit 51 may include: a first receiving module, configured to obtain the information from an operation administration and maintenance (OAM) device; or a second receiving module, configured to obtain the information from the serving eNB.

The foregoing relay station executes the procedure described in the method, so that probability of a handover failure is reduced, and the serving eNB may select a relatively correct handover manner. It should be noted that, the eNB described in the embodiments includes, but is not limited to, any eNB that provides an access service, such as NodeB, eNodeB, and BS; and the user equipment subordinate to the eNB includes, but is not limited to, a terminal, such as a mobile phone, a computer, or a PDA (Personal Digital Assistant, personal digital assistant).

Persons of ordinary skill in the art may understand that all or part of the procedures of the method in the foregoing embodiments may be implemented by a computer program instructing relevant hardware including a hardware processor. The program may be stored in a computer readable storage medium accessible to the hardware processor. When the program runs, the procedures of the method in each preceding embodiment are executed. The storage medium may be a magnetic disk, an optical disk, a read-only memory (Read-Only Memory, ROM), or a random access memory (Random Access Memory, RAM).

The embodiments may be applied to an LTE-A technology, to achieve a better effect and reduce probability of a handover failure. The solutions provided in the embodiments are also applicable to other similar cellular wireless communication technology to achieve similar benefits. Therefore, the foregoing descriptions only described some of the possible embodiments that are contemplated. Those skilled in the art may make various modifications or replacements to these embodiments. Such modified embodiments are understood to fall within the spirit and scope of the claims.

What is claimed is:

1. A handover processing method, comprising:
   obtaining, by a relay station, a Globally Unique (GU) Group ID indicating a mobility management entity (MME) pool to which a neighboring eNodeB (eNB) belongs;
   determining, based on the GU Group ID, whether a MME of a user equipment served by the relay station is in the MME pool to which the neighboring eNB belongs; and
   determining, by the relay station, that an X2 interface between a serving eNB of the relay station and the neighboring eNB cannot be used for handover handing over the user equipment when the MME of the user equipment is not in the MME pool to which the neighboring eNB belongs.

2. The method according to claim 1, wherein obtaining of the GU Group ID comprises one of the following:
   obtaining the GU Group ID from an operation administration and maintenance OAM device; and
   obtaining the GU Group ID from the serving eNB.

3. The method according to claim 2, wherein:
   obtaining of the GU Group ID from the serving eNB comprises one of the following:
   obtaining the GU Group ID from an X2 setup request message, an X2 setup response message, or an eNB configuration update message, wherein the X2 setup request message, the X2 setup response message, or the eNB configuration update message is sent by the serving eNB; and
   obtaining the GU Group ID from a newly defined message sent by the serving eNB.

4. The method according to claim 1, after determining that the X2 interface between the serving eNB and the neighboring eNB cannot be used for handing over the user equipment, the method further comprising:
   initiating, by the relay station, an S1 handover request message to the serving eNB, so as to hand over the user equipment from the serving eNB to the neighboring eNB by using a S1 interface between the serving eNB and the neighboring eNB.

5. The method according to claim 1, further comprising:
   determining, by the relay station, that the X2 interface between the serving eNB and the neighboring eNB can be used for handing over the user equipment when the MME of the user equipment is in the MME pool to which the neighboring eNB belongs.

6. The method according to claim 5, further comprising:
   initiating, by the relay station, an X2 handover request message to the serving eNB, so as to hand over the user equipment from the serving eNB to the neighboring eNB by using the X2 interface.

7. A relay station, comprising: an information obtaining unit configured to obtain information pool (MME) to which a Globally Unique (GU) Group ID indicating a mobility management entity (MME) pool to which a neighboring eNodeB (eNB) belongs;
   a determining unit configured to determine, based on the GU Group ID, whether a MME of a user equipment served by the relay station is in the MME pool to which the neighboring eNB belongs; and a handover executing unit configured to initiate an S1 handover request message to a serving eNB of the relay station so as to hand over the user equipment from the serving eNB to the neighboring eNB by using a S 1 interface between the serving eNB and the neighboring eNB, when the MME of the user equipment is not in the MME pool to which the neighboring eNB belongs.

8. The relay station according to claim 7, wherein the handover executing unit is further configured to initiate an X2 handover request message to the serving eNB so as to hand over the user equipment from the serving eNB to the neighboring eNB by using an X2 interface between the serving and the neighboring eNB when the MME of the user equipment is in the MME pool to which the neighboring eNB belongs.

9. A handover processing method, comprising:
   obtaining, by a relay station, a Globally Unique (GU) Group ID indicating a mobility management entity (MME) pool to which a neighboring eNodeB (eNB) belongs;
   determining, based on the GU Group ID, whether a MME of a user equipment served by the relay station is in the MME pool to which the neighboring eNB belongs; and
   initiating, by the relay station, an S1 handover request message to a serving eNB of the relay station so as to handover hand over the user equipment from the serving eNB to the neighboring eNB by using a S 1 interface between the serving eNB and the neighboring eNB, when the MME of the user equipment is not in the MME pool to which the neighboring eNB belongs.

10. The method according to claim 9, wherein obtaining of the GU Group ID comprises one of the following:
    obtaining the GU Group ID from an operation administration and maintenance OAM device; and
    obtaining the GU Group ID from the serving eNB.

11. The method according to claim 10, wherein:
    obtaining of the GU Group ID from the serving eNB comprises one of the following:

obtaining the GU Group ID from an X2 setup request message, an X2 setup response message, or an eNB configuration update message, wherein the X2 setup request message, the X2 setup response message, or the eNB configuration update message is sent by the serving eNB; and obtaining the GU Group ID from a newly defined message sent by the serving eNB.

12. The method according to claim 9, further comprising:

initiating, by the relay station, an X2 handover request message to the serving eNB so as to hand over the user equipment from the serving eNB to the neighboring eNB by using an X2 interface between the serving and the neighboring eNB when the MME of the user equipment is in the MME pool to which the neighboring eNB belongs.

13. A communication system comprising: a relay station; and a serving eNodeB (eNB) of the relay station, wherein the relay station is configured to:

obtain information for determining whether a (MME) of a Globally Unique (GU) Group ID indicating a mobility management entity (MME) pool to which a neighboring eNodeB belongs;

determine, based on the GU Group ID, whether a MME of a user equipment served by the relay station is in the MME pool to which the neighboring eNB belongs and MME to which the initiating, by the relay station, an S1 handover request message to the serving eNB so as to hand over the user equipment from the, serving eNB to the neighboring eNB by using a S1 interface between the serving eNB and the neighboring eNB, when the MME of the user equipment is not in the MME pool to which the neighboring eNB belongs.

* * * * *